(12) United States Patent
Pan

(10) Patent No.: US 8,860,666 B2
(45) Date of Patent: *Oct. 14, 2014

(54) PORTABLE COMPUTER WITH A TWISTABLE DISPLAY

(76) Inventor: Yang Pan, Singapore (SG)

(*) Notice: Subject to any disclaimer, the term of this patent is extended or adjusted under 35 U.S.C. 154(b) by 297 days.

This patent is subject to a terminal disclaimer.

(21) Appl. No.: 13/540,627

(22) Filed: Jul. 3, 2012

(65) Prior Publication Data

US 2014/0009398 A1 Jan. 9, 2014

(51) Int. Cl.
*G06F 3/02* (2006.01)
*G09G 5/00* (2006.01)

(52) U.S. Cl.
USPC ....... 345/168; 345/169; 345/173; 361/679.55

(58) Field of Classification Search
CPC ... G06F 1/1616; G06F 3/0202; G06F 3/0219; G06F 3/0213; G06Q 30/0601
USPC .............................. 345/168–179; 361/679.55
See application file for complete search history.

(56) References Cited

U.S. PATENT DOCUMENTS

| | | | |
|---|---|---|---|
| 4,903,222 A | 2/1990 | Carter et al. | |
| 4,959,887 A | 10/1990 | Gruenberg et al. | |
| 5,168,426 A | 12/1992 | Hoving et al. | |
| 5,534,893 A | 7/1996 | Hansen, Jr. et al. | |
| 5,719,799 A | 2/1998 | Isashi | |
| 6,157,958 A | 12/2000 | Armitage et al. | |
| 6,272,006 B1 | 8/2001 | Lee | |
| 6,275,376 B1 | 8/2001 | Moon | |
| 6,301,101 B1 | 10/2001 | Anzai et al. | |
| 6,771,494 B2 | 8/2004 | Shimano | |
| 6,788,527 B2 | 9/2004 | Doczy et al. | |
| 6,928,433 B2 | 8/2005 | Goodman et al. | |
| 8,174,827 B2 * | 5/2012 | Pan | 361/679.55 |
| 2004/0021681 A1 | 2/2004 | Liao | |
| 2004/0055446 A1 | 3/2004 | Robbin et al. | |
| 2008/0062625 A1 | 3/2008 | Batio | |
| 2011/0181518 A1 * | 7/2011 | Pan | 345/173 |
| 2011/0188199 A1 * | 8/2011 | Pan | 361/679.55 |

* cited by examiner

*Primary Examiner* — Kimnhung Nguyen

(57) ABSTRACT

A portable computing device is disclosed. The device is based upon a laptop computer according to the preferred embodiment. The device comprises a twistable display screen. The device is operated as a general purpose computer when the display screen is pivoted to a position facing a keyboard. The device is used as a special purpose computer in a tablet form when the display is pivoted to a position on the top face of the device. The special purpose computer may be a media player, an e-book reader, a game console, a digital camera, a mobile phone, an e-mail reader and a web browser. The special purpose computer consumes substantially less power than the general purpose computer by employing a less complicated operating system.

20 Claims, 16 Drawing Sheets

PORTABLE COMPUTER WITH A TWISTABLE DISPLAY

CROSS-REFERENCE TO RELATED APPLICATIONS

N. A.

BACKGROUND

1. Field of Invention

This invention relates generally to a portable computing device. More specifically, the invention describes a portable computing device with a twistable display.

2. Description of Prior Art

A laptop computer is a personal computer for mobile use. A laptop computer integrates most of components of a desktop computer and is used for general computing. Laptops are also sometimes called notebook or netbook computers. It has been a great challenge to minimize power consumption of the laptop computer and to increase its battery operation time.

A tablet computer refers to a slate shaped portable computing device, equipped with a touch sensitive type of display screen. A user operates the device by the use of his or her finger or a stylus. Because it is very portable, tablet computers are rapidly gaining popularity. However, the tablet computer due to lack of a keyboard may not be best suited for applications such as, for example, word processing. A tablet computer consumes typically less power than a laptop computer.

Therefore, there is a need to integrate a laptop computer and a tablet computer into a single piece of portable device while minimizing power consumption and increasing operation time of a battery.

SUMMARY OF THE INVENTION

It is an object of the present invention to provide a portable computing device with improved power consumptions.

It is another object of the present invention to provide a portable computing device with a twistable display screen that can be used either as a general purpose computer or as a low power special purpose computer, depending on positions of the display screen.

According to a preferred embodiment of the present invention, the improved portable computing device comprises a display screen, a housing part and a pivot and hinge part. The portable computing device may be operated as a general purpose computer when the display screen is pivoted to a position facing a keyboard of the device. The portable computing device may be operated as a special purpose computer when the display screen is pivoted to be on the top face of the device.

The general purpose computer may be operated with a first operating system and the special purpose computer may be operated with a second operating system. In one embodiment, the general purpose computer and the special purpose computer may have different sets of components other than power supply and display screen. In another embodiment, the general purpose computer and the special purpose computer may share some of other components. The general purpose computer further includes a Central Processing Unit (CPU). The special purpose computer further includes a low power processor. The low power processor may be a low power operation mode of the CPU. The special purpose computer consumes less power than the general purpose computer. The special purpose computer is in a tablet computer form when the display screen is pivoted to be on the top of the device.

The special purpose computer is a dedicated media player according to one implementation.

The special purpose computer is a dedicated e-book reader according to another implementation.

The special purpose computer is a game console according to yet another implementation.

The special purpose computer is a dedicated digital camera according to still another implementation.

The special purpose computer is a dedicated mobile phone according to still another implementation.

The special purpose computer is a dedicated e-mail reader according to still another implementation.

The special purpose computer is a dedicated web browser according to still another implementation.

According to one implementation, the special purpose computer includes a user selectable operation mode. The user may select the special purpose computer as a dedicated media player or as any other special purpose device using a graphical user interface of the general purpose computer. The user may also select the operation mode using a graphical user interface of the special purpose computer in the tablet form.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

References will now be made in detail to a few embodiments of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of invention as defined by the appended claims.

The present disclosure uses a laptop with a pivotable or twistable display screen as an exemplary case to illustrate the inventive concept. The inventive concept may be applied to any other general purpose portable computing devices such as, for example, a netbook and a smart phone. Netbooks are a branch of subnotebooks, a rapidly evolving category of small, light ad inexpensive laptop computers suited for general computing and accessing web-based applications.

A dedicated media player as the special purpose computer is employed to illustrate the inventive concept. The media assets may include an audio file such as a music clip, a video file, a text file such as an e-book, a multimedia file and a movie. The media assets may be stored in a storage unit of the portable computing device. The media assets may also be delivered from a server in the Internet to the portable tablet device.

Figure 1:
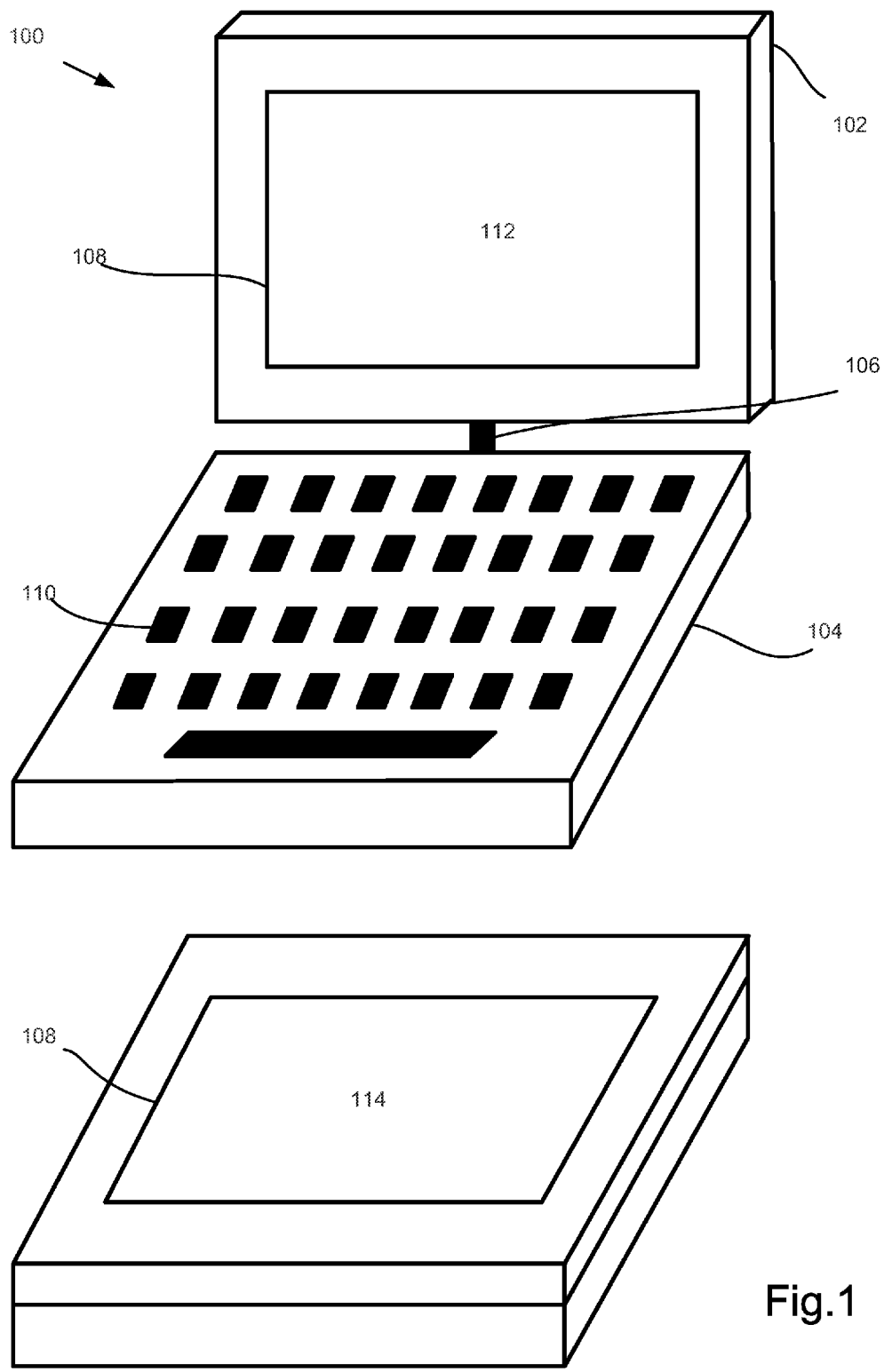
FIG. 1 is a schematic diagram illustrating an exemplary portable computing device with a twistable display screen.

FIG. 1 is a schematic diagram illustrating an exemplary portable computing device 100. Device 100 comprises a display part 102, a housing part 104 and a pivot and hinge part 106. Display part 102 further comprises a display screen 108. According to a preferred embodiment of the present invention, display screen 108 is a touch sensitive type of Liquid Crystal Display (LCD). Housing part 104 comprises a keyboard 110. Housing part 104 may further comprise a pointing device such as a mouse. Electronic components of device 100 are mostly contained in housing part 104. Pivot and hinge part 106 provides a mechanism for positioning display screen 108 to be either on the top face of the device as a special purpose computer in a tablet form or in a position facing keyboard 110 as a general purpose computer. Portable device 100 as the general purpose computer is operated by a first operation system and displays a first graphical user interface 112. Portable device 100 as the special purpose computer is operated by a second operation system and displays a second graphical user interface 114. Graphical user interface 114 may be a hierarchical user interface when the special purpose computer is a dedicated media player.

Portable device 100 operated as the special purpose computer may consume substantially less power than operated as the general purpose computer.

Figure 2:
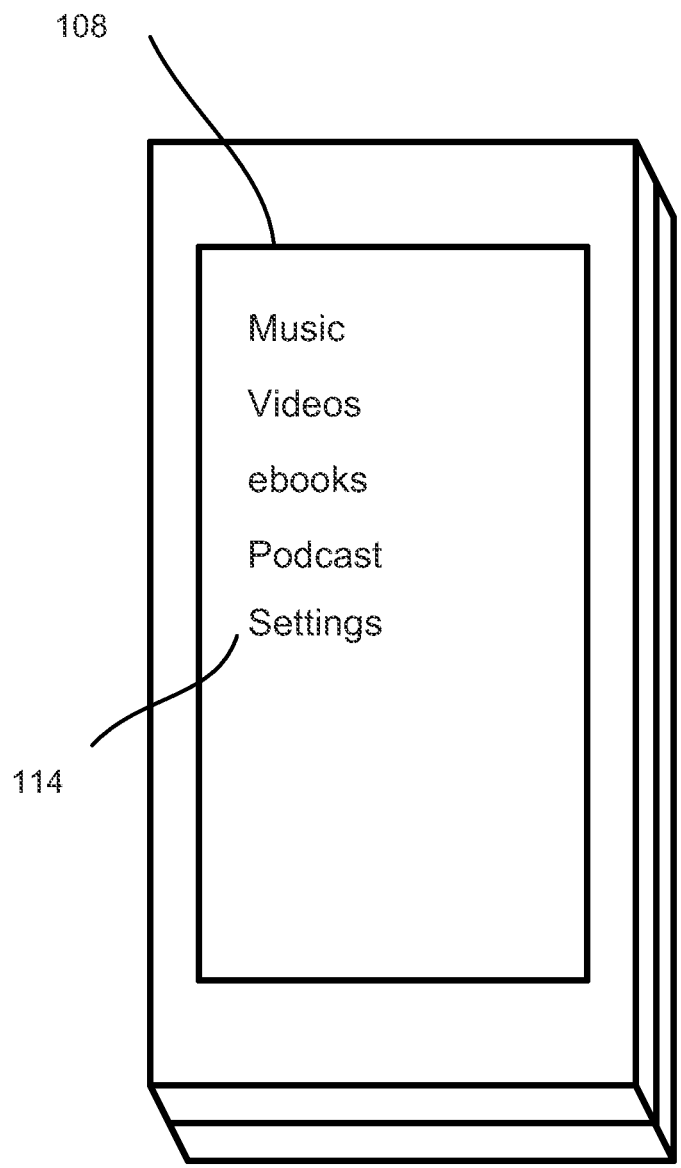
FIG. 2 is a schematic diagram illustrating an exemplary implementation that the device is used as a media player with a hierarchical user interface when the display screen is on the top face of the device.

FIG. 2 is a schematic diagram illustrating that portable device 100 is used as a dedicated media player with a hierarchical user interface when the display screen is on the top face of the device. When the device is used as a media player (special purpose computer), the device is operated in a low power mode. An exemplary graphical user interface 114 as a hierarchical user interface is employed to guide the user to select a desired media asset in a hierarchical manner.

Figure 3A:
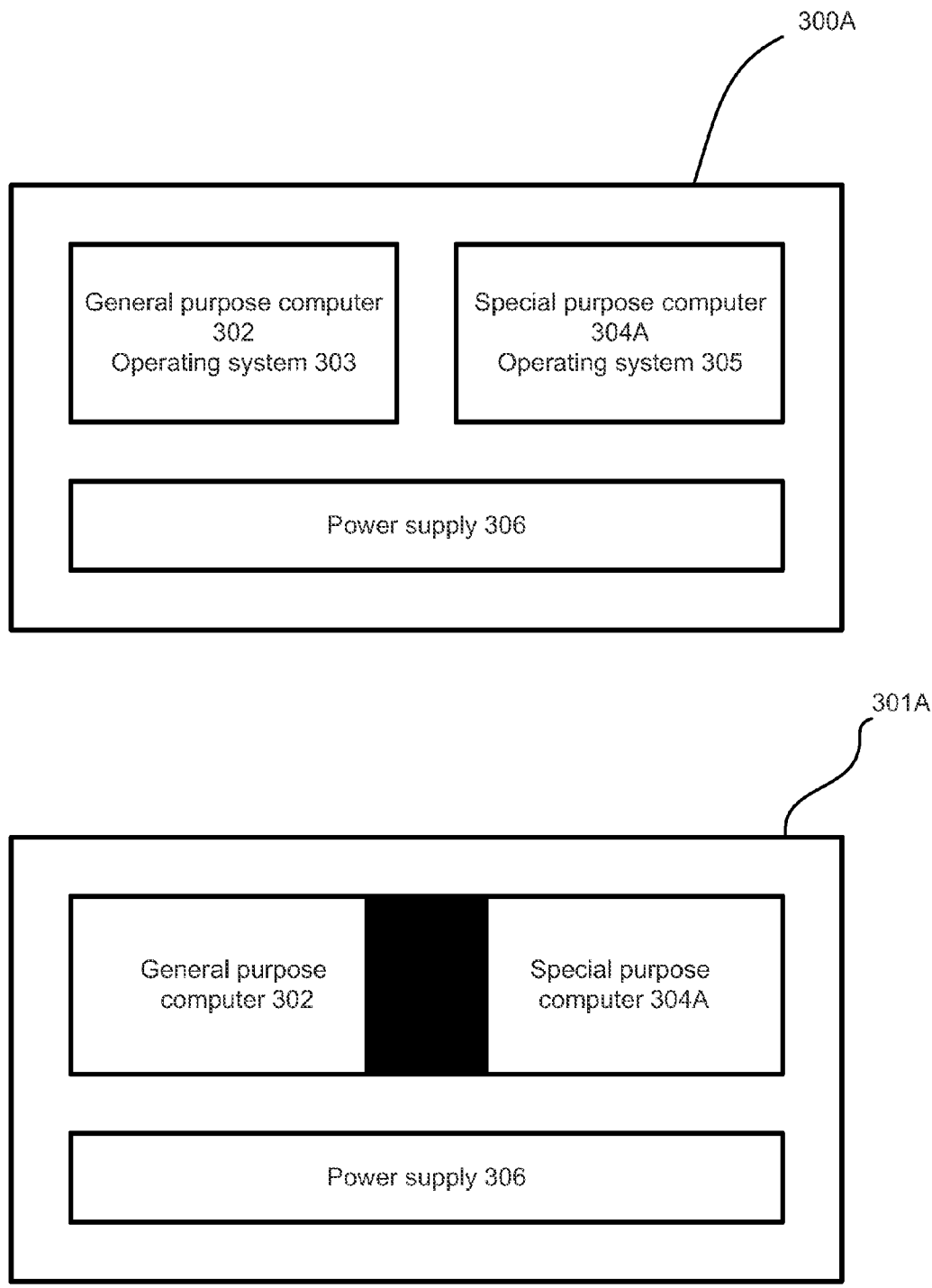
FIG. 3A is a schematic diagram illustrating two different implementations of the improved portable computing device including a general purpose computer and a special purpose computer.

FIG. 3A is a schematic diagram illustrating two different implementations of the improved portable computing device 100 including a general purpose computer 302 and a special purpose computer 304A. As illustrated exemplarily in 300A, general purpose computer 302 is operated with operating system 303. Special purpose computer 304A is operated with operating system 305. Operating system 303 and operating system 305 may be different operating systems. For example, operating system 303 may be a Microsoft Windows® based operating system and operating system 305 may be a specialized operating system for special purpose computer 304A. Running operating system 305 may consume substantially less power than running operating system 303. Operating system 303 may be stored in a memory unit of general purpose computer 302. Operating system 305 may be stored in a memory unit of special purpose computer 304A.

General purpose computer 302 and special purpose computer 304A may be two different devices in one package sharing the same power supply 306 and display screen 108 (not shown in FIG. 3A). As shown in 301, general purpose computer 302 and special purpose computer 304A may share some components in additional to sharing the power supply 306. The shared components may include storage units and some signal processing units. General purpose computer 302 includes a CPU. Special purpose computer 304 may include a special data processor. The special data processor may be operated at lower power than the CPU. The special data processor may include a low power operation mode of the CPU.

In an extreme case, special purpose computer 304A may utilize a subset of components of general purpose computer 302.

Figure 3B:
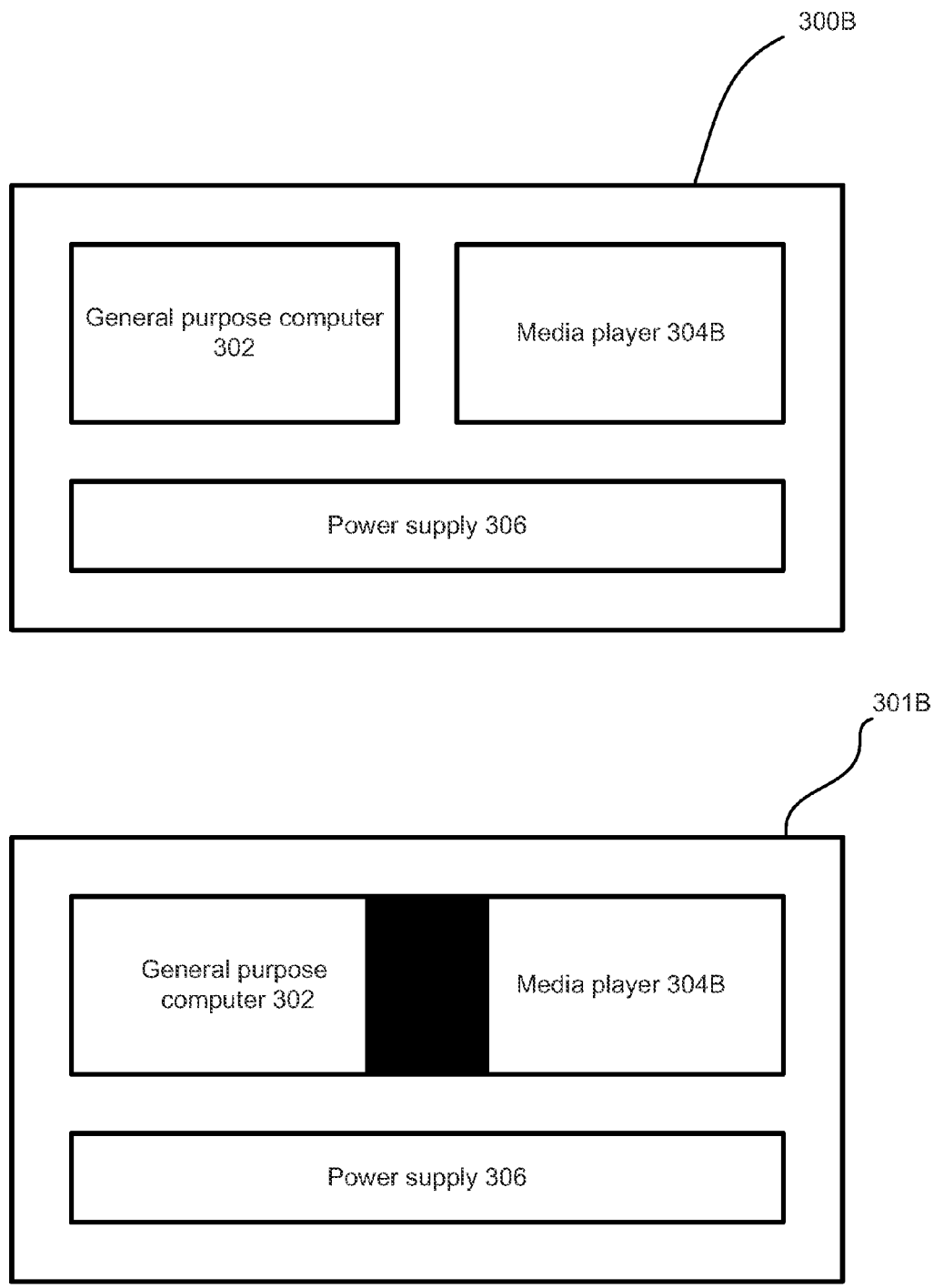
FIG. 3B is a schematic diagram illustrating two different implementations of an exemplary portable computing device including a general purpose computer and a dedicated media player.

FIG. 3B is a schematic diagram illustrating two different implementations of the improved portable computing device 100 including a general purpose computer 302 and a dedicated media player 304B. Media player 304B may be employed to deliver an audio, a video, a movie and an image such as a photo.

General purpose computer 302 and media player 304A may be two different devices in one package sharing the same power supply 306 and display screen 108 (not shown in FIG. 3B). As shown in 301B, general purpose computer 302 and media player 304B may share some components in additional to sharing the power supply 306. The shared components may include storage units and some signal processing units. General purpose computer 302 includes a CPU. Media player 304B may include a media processor. The media processor may be operated at lower power than the CPU. The media processor may include a low power operation mode of the CPU.

Figure 4:
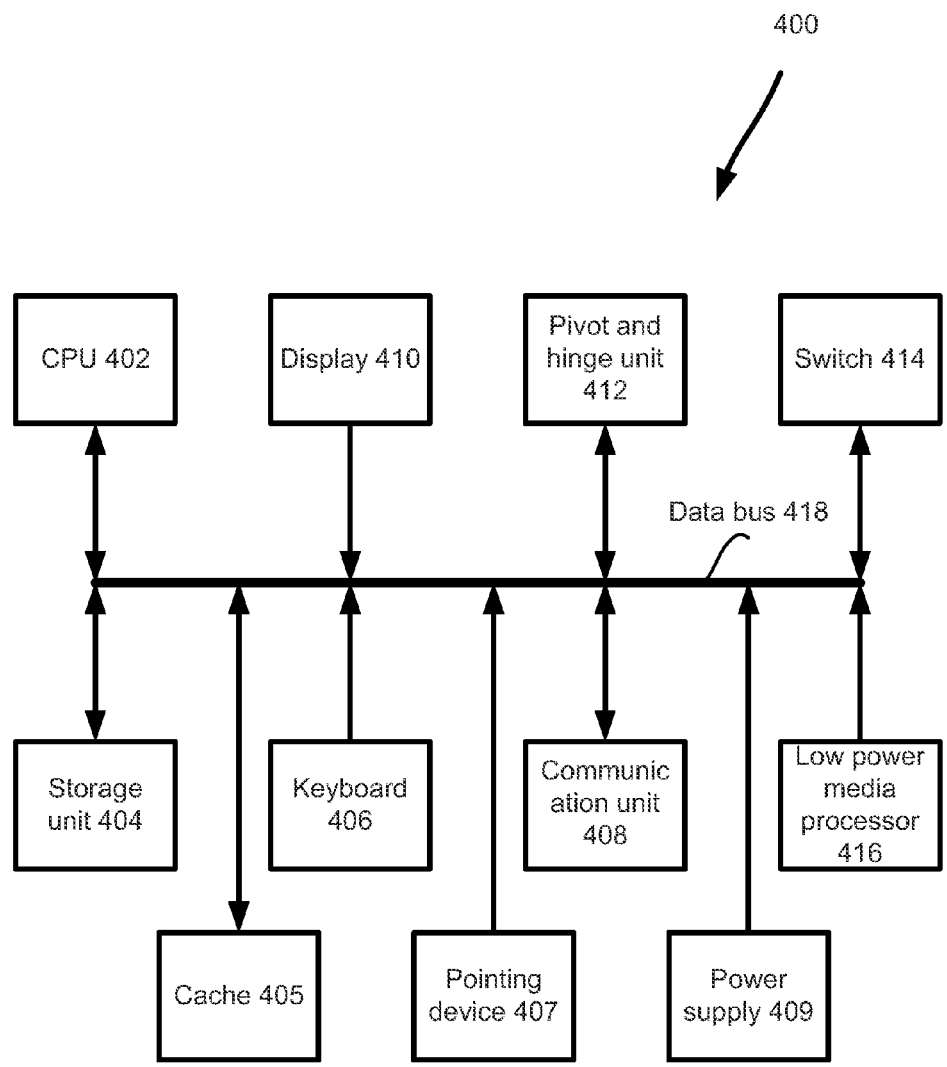
FIG. 4 is a schematic diagram illustrating functional blocks of an exemplary implementation of the special purpose computer as a media player.

FIG. 4 is a schematic diagram illustrating functional blocks of an exemplary implementation of portable device 400 including dedicated media player 304B. The exemplary portable device 400 comprises CPU 402 for controlling operations of the device. Device 400 further comprises a storage unit 404 and a cache 405. Storage unit 404 may be one or a plurality of flash memory devices. Storage unit 404 may also be a magnetic storage device. Cache 405 may be a SRAM (Static Random Access Memory) providing a short access time. Device 400 also includes input devices such as a keyboard 406 and a pointing device 407. Pointing device 407 may be a mouse or a touch-pad. Communication unit 408 is used to connect device 400 to a communication network such as the Internet. The communication network may also be an ad hoc network conforming to various protocols such as Bluetooth, ZigBee and WiFi. Power supply 409 provides power for the operations of device 400. Power supply 409 may be a rechargeable battery in an exemplary case.

Exemplary device 400 includes a display screen 410. 410 may be a touch sensitive type of LCD. Display screen 410 is encased on the display part supported by a pivot and hinge part 412. Display screen 410 may be pivoted to one of two operable positions: one is on the top face of the device for the special purpose computer and another is in a conventional position facing the keyboard for the general purpose computer. A switch 414 is used in an exemplary manner to provide a switching means for device to be operated as the dedicated media player or as the general purpose computing device. The low power media processor 416 may comprise a low power processor, a DSP (Digital Signal Processor) and a CODEC (Coding and Decoding). Device 400 operated as a media player may consume significantly less power by design. Low power media processor 416 may comprise a low power operation mode of the CPU 402 in an alternative implementation. Data bus 418 provides a means for the high speed data transfer. Device 400 operated as the dedicated media player may have an independent operating system. The operating system may be stored in storage unit 404 or in a separate storage unit for the media player. The operating system of the media player is compact and extremely efficient by design and therefore consumes much less power.

Figure 3C:
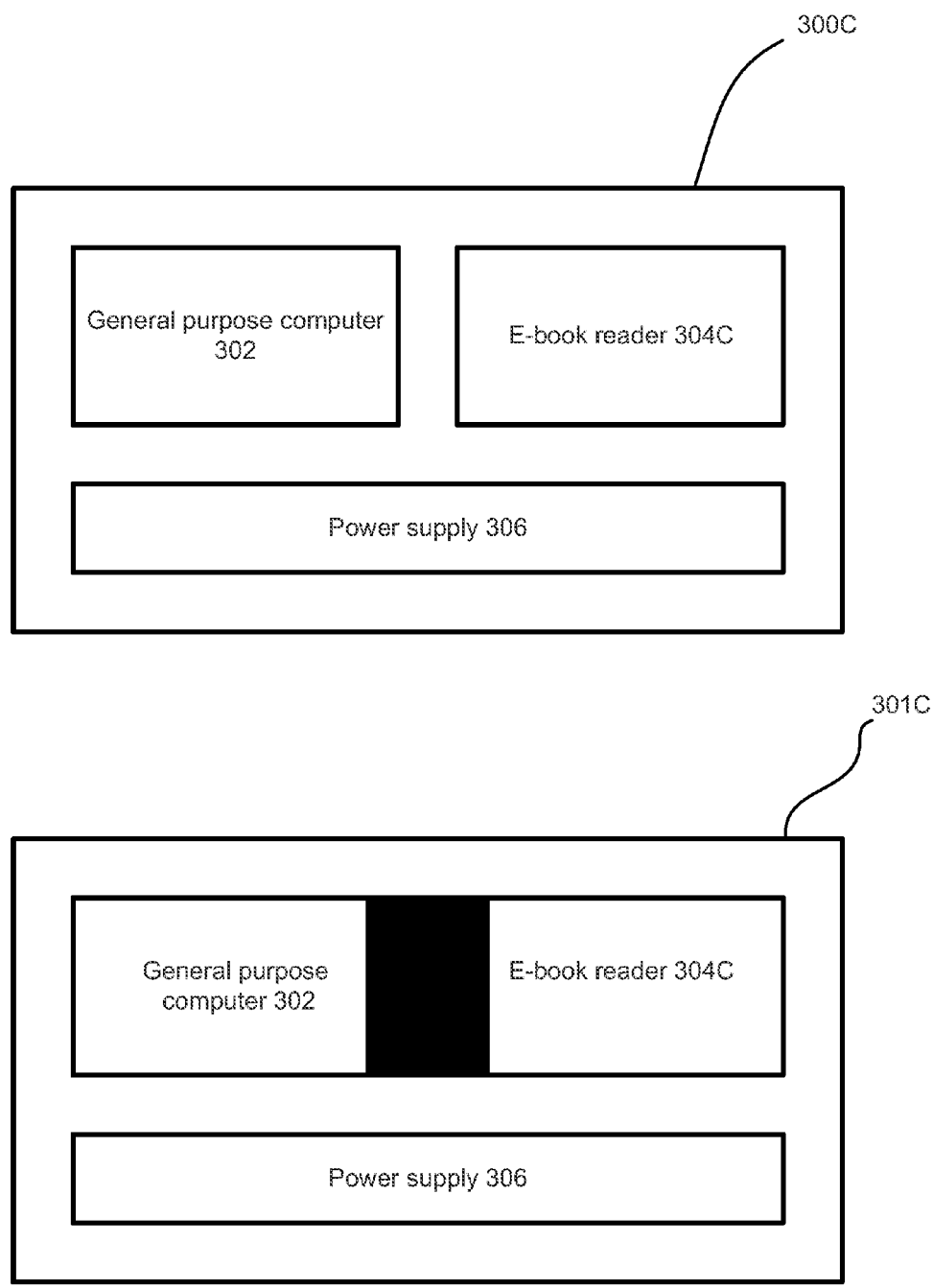
FIG. 3C is a schematic diagram illustrating two different implementations of an exemplary portable computing device including a general purpose computer and a dedicated e-book reader.

FIG. 3C is a schematic diagram illustrating two different implementations of the improved portable computing device 100 including a general purpose computer 302 and a dedicated e-book reader 304C. E-book reader 304B may be employed to deliver an e-book for a user to read.

As shown in 300C, general purpose computer 302 and e-book reader 304C may be two different devices in one package sharing the same power supply 306 and display screen 108 (not shown in FIG. 3C). As shown in 301C, general purpose computer 302 and e-book reader 304C may share some components in additional to sharing the power supply 306. The shared components may include storage units and some signal processing units. General purpose computer 302 includes a CPU. E-book reader 304C may include a media processor specially designed for e-book reader. The media processor may be operated at lower power than the CPU. The media processor may include a low power operation mode of the CPU.

Figure 3D:
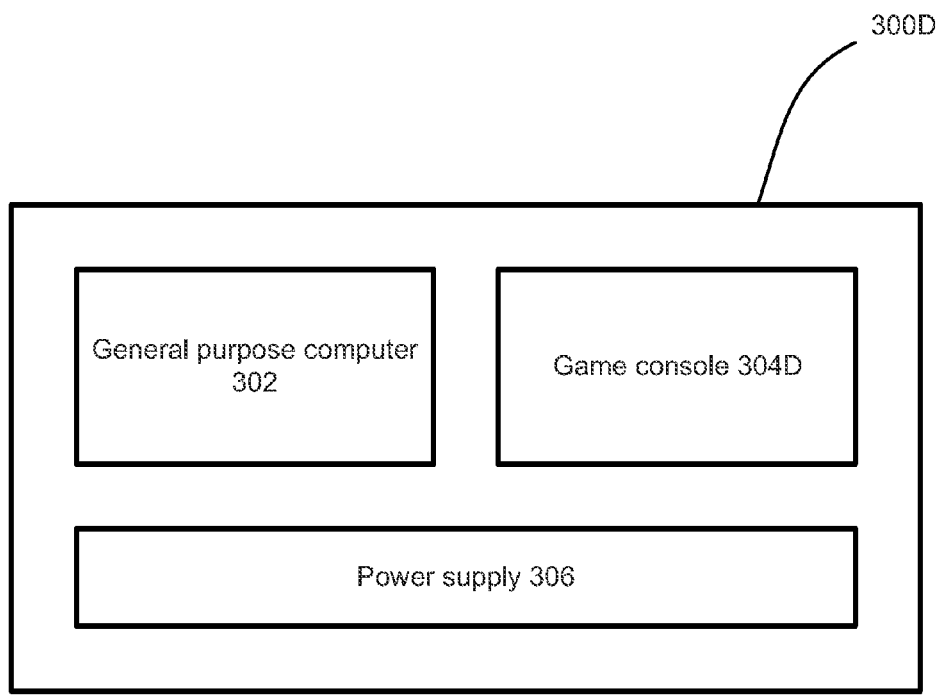
FIG. 3D is a schematic diagram illustrating two different implementations of an exemplary portable computing device including a general purpose computer and a dedicated game console.
Figure 3D:
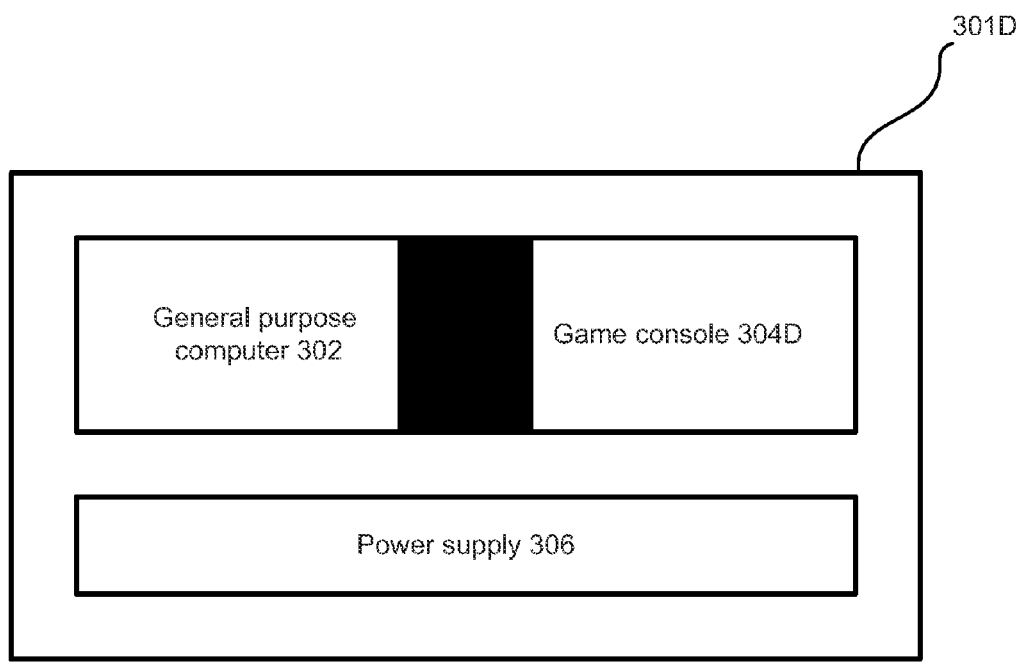

FIG. 3D is a schematic diagram illustrating two different implementations of the improved portable computing device 100 including a general purpose computer 302 and a dedicated game console 304D.

As shown in 300D, general purpose computer 302 and game console 304D may be two different devices in one package sharing the same power supply 306 and display screen 108 (not shown in FIG. 3D). As shown in 301C, general purpose computer 302 and game console 304D may share some components in additional to sharing the power supply 306. The shared components may include storage units and some signal processing units. General purpose computer 302 includes a CPU. Game console 304D may include a game processor. The game processor may be operated at lower power than the CPU. The game processor may include a low power operation mode of the CPU.

Figure 3E:
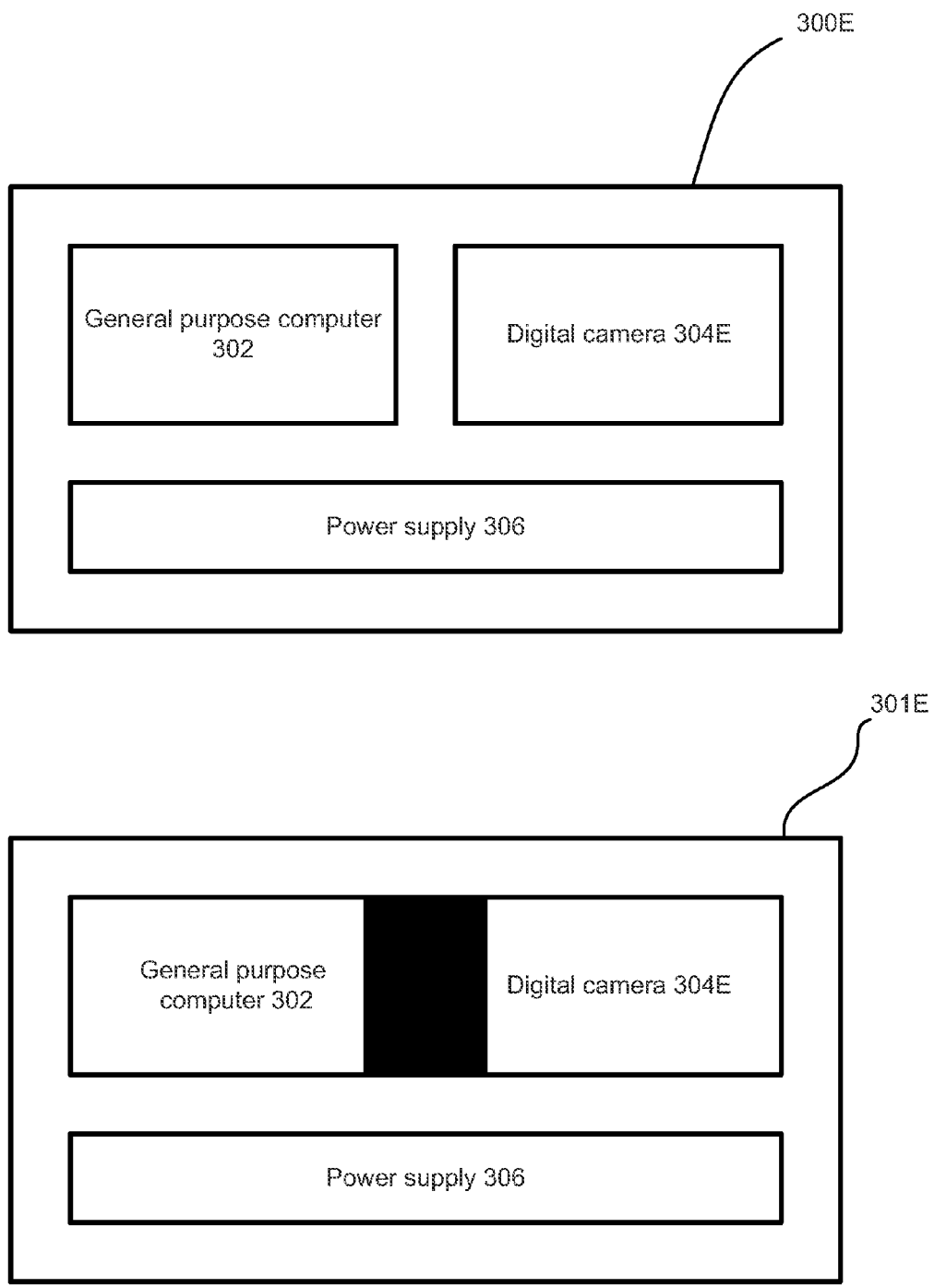
FIG. 3E is a schematic diagram illustrating two different implementations of an exemplary portable computing device including a general purpose computer and a dedicated digital camera.

FIG. 3E is a schematic diagram illustrating two different implementations of the improved portable computing device 100 including a general purpose computer 302 and a dedicated digital camera 304E.

As shown in 300E, general purpose computer 302 and digital camera 304E may be two different devices in one package sharing the same power supply 306 and display screen 108 (not shown in FIG. 3E). As shown in 301E, general purpose computer 302 and digital camera 304E may share some components in additional to sharing the power supply 306. The shared components may include storage units and some signal processing units. General purpose computer 302 includes a CPU. Digital camera 304E may include a low power processor. The low power processor may be operated at lower power than the CPU. The low power processor may include a low power operation mode of the CPU.

Figure 3F:
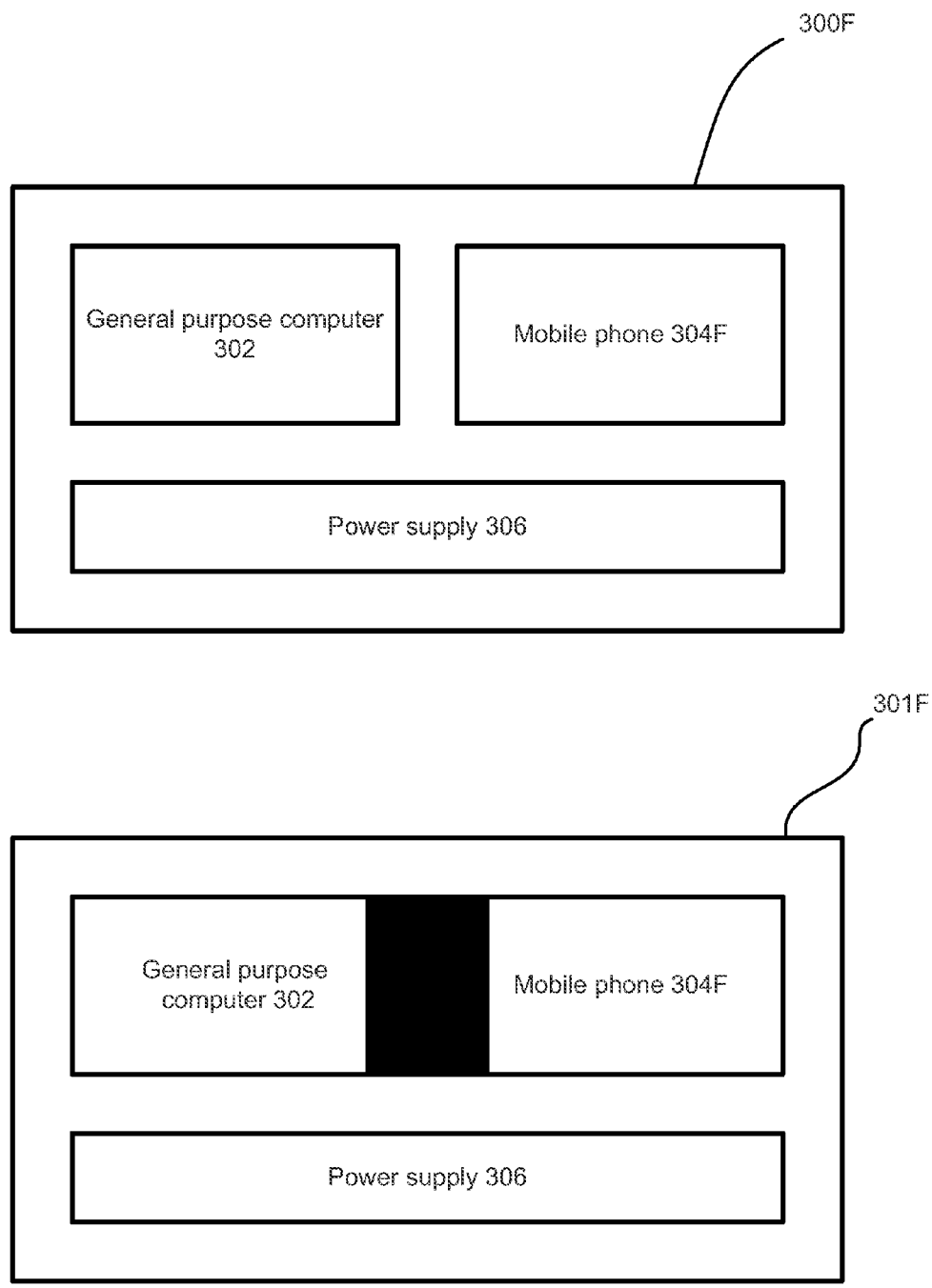
FIG. 3F is a schematic diagram illustrating two different implementations of an exemplary portable computing device including a general purpose computer and a dedicated mobile phone.

FIG. 3F is a schematic diagram illustrating two different implementations of the improved portable computing device 100 including a general purpose computer 302 and a dedicated mobile phone 304F.

As shown in 300F, general purpose computer 302 and mobile phone 304F may be two different devices in one package sharing the same power supply 306 and display screen 108 (not shown in FIG. 3F). As shown in 301F, general purpose computer 302 and mobile phone 304F may share some components in additional to sharing the power supply 306. The shared components may include storage units and some signal processing units. General purpose computer 302 includes a CPU. Mobile phone 304F may include a low power processor. The low power processor may be operated at lower power than the CPU. The low power processor may include a low power operation mode of the CPU. Mobile phone 304F may be a voice communication device. Mobile phone 304F may also be a video phone. According to one implementation, a user may receive a phone call when the portable device is operated as general purpose computer 302. The user may pivot the display screen to be on the top face of the device. The device is switched as mobile phone 304F and is connected to a communication device of a caller through a communication network.

Figure 3G:
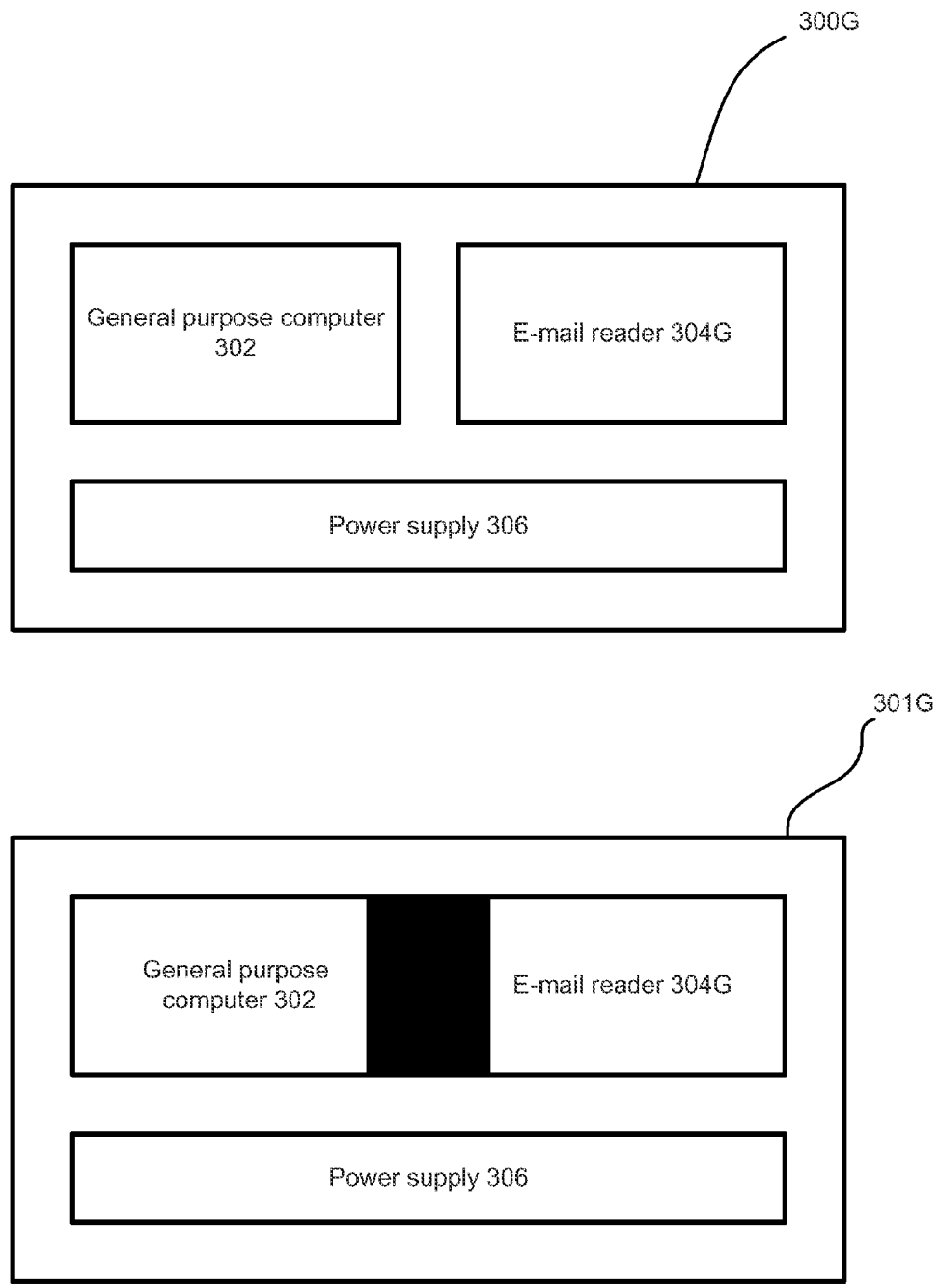
FIG. 3G is a schematic diagram illustrating two different implementations of an exemplary portable computing device including a general purpose computer and a dedicated e-mail reader.

FIG. 3G is a schematic diagram illustrating two different implementations of the improved portable computing device 100 including a general purpose computer 302 and a dedicated e-mail reader 304G.

As shown in 300G, general purpose computer 302 and e-mail reader 304G may be two different devices in one package sharing the same power supply 306 and display screen 108 (not shown in FIG. 3G). As shown in 301G, general purpose computer 302 and e-mail reader 304G may share some components in additional to sharing the power supply 306. The shared components may include storage units and some signal processing units. General purpose computer 302 includes a CPU. E-mail reader 304G may include a low power processor. The low power processor may be operated at lower power than the CPU. The low power processor may include a low power operation mode of the CPU.

Figure 3H:
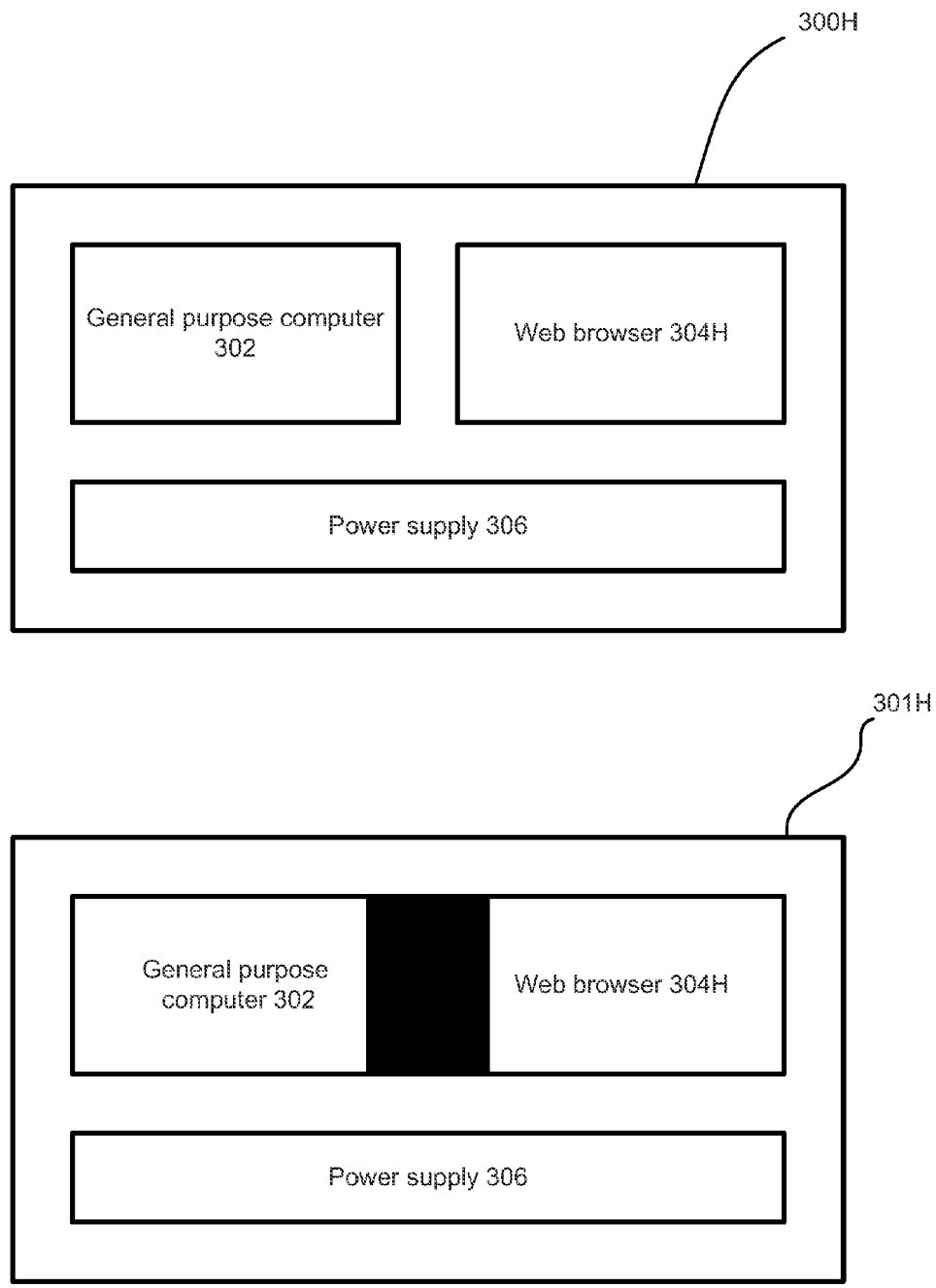
FIG. 3H is a schematic diagram illustrating two different implementations of an exemplary portable computing device including a general purpose computer and a dedicated web browser.
Figure 3L:
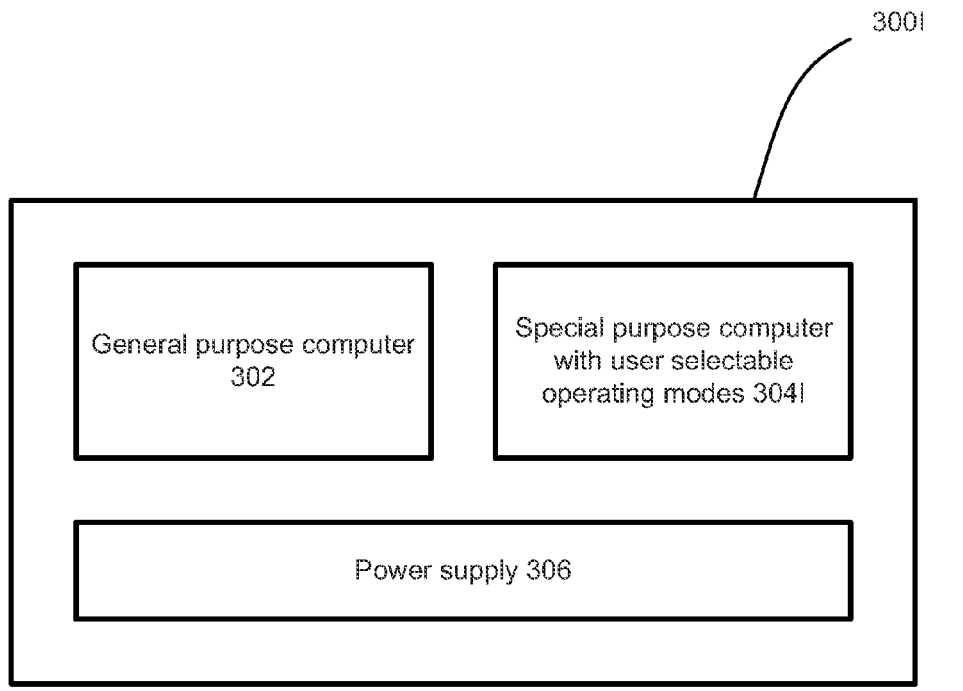
FIG. 3I is a schematic diagram illustrating two different implementations of an exemplary portable computing device including a general purpose computer and a special purpose computer with a user selectable operation mode.
Figure 3L:
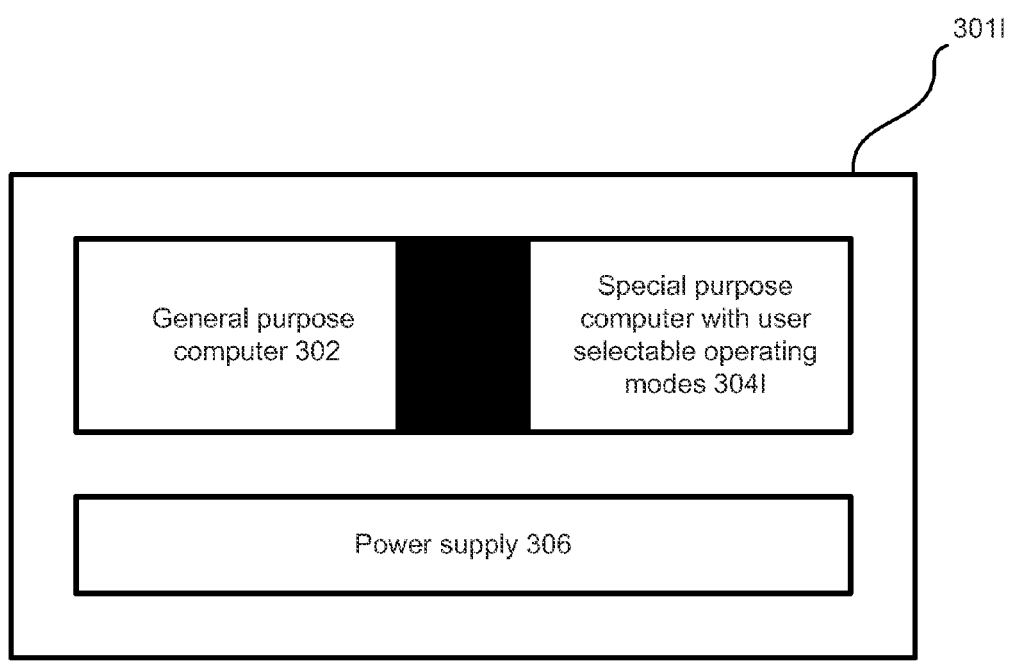

FIG. 3H is a schematic diagram illustrating two different implementations of the improved portable computing device 100 including a general purpose computer 302 and a dedicated web browser 304H.

As shown in 300H, general purpose computer 302 and web browser 304H may be two different devices in one package sharing the same power supply 306 and display screen 108

(not shown in FIG. 3H). As shown in 301H, general purpose computer 302 and web browser 304H may share some components in additional to sharing the power supply 306. The shared components may include storage units and some signal processing units. General purpose computer 302 includes a CPU. Web browser 304H may include a low power processor. The low power processor may be operated at lower power than the CPU. The low power processor may include a low power operation mode of the CPU.

FIG. 3I is a schematic diagram illustrating two different implementations of an exemplary portable computing device 100 including general purpose computer 302 and special purpose computer 304I with a user selectable operation mode. According to one implementation, a list of user selectable special purpose computers is displayed on display screen 108 using graphical user interface 112. The user may select the special purpose computer as a dedicated media player or any other type of device (i.e., a dedicated e-book reader, a dedicated game console, a dedicated mobile phone, a dedicated web browser and a dedicated e-mail reader). After display screen 108 is pivoted to be on the top face of the portable device, the device is operated as the special purpose computer according to the user's selection.

According to another implementation, the user may make a selection after display screen 108 is pivoted to the top face of the device. User selectable operation modes for the special purpose computer may be displayed on display screen 108 using graphical user interface 114. The special purpose computer will be operated according to the user's selection.

Figure 5:
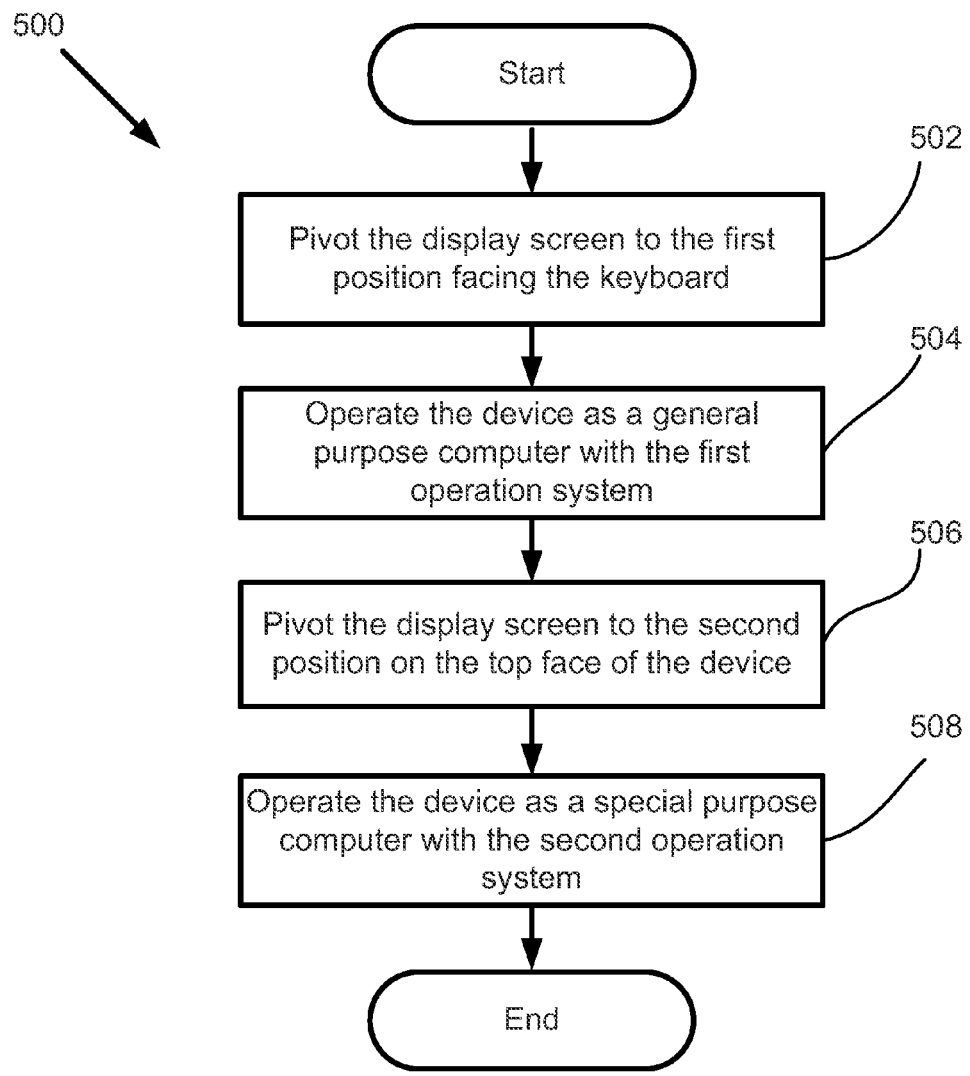
FIG. 5 is a flowchart illustrating operation of an exemplary portable computing device.

FIG. 5 is a flowchart illustrating operation of an exemplary portable computing device 100. Process 500 starts with step 502 that display screen 108 is pivoted to a first position facing the keyboard. Portable computing device 100 is operated as a general purpose computer in step 504. The general purpose computer is operated with a first operating system. In an exemplary case, the first operation system is a Microsoft Windows® operating system. In step 506, display screen 108 is pivoted to be on the top face of portable device 100. Portable device 100 is operated in step 508 as a special purpose computer such as, for example, as a dedicated media player or as a dedicated digital camera. Portable device 100 operated as the special purpose computer may be operated with a second operating system. The second operating system is less complicated than the first operating system. Portable device 100 operated as the special purpose computer consumes less power than operated as the general purpose computer.

Figure 6A:
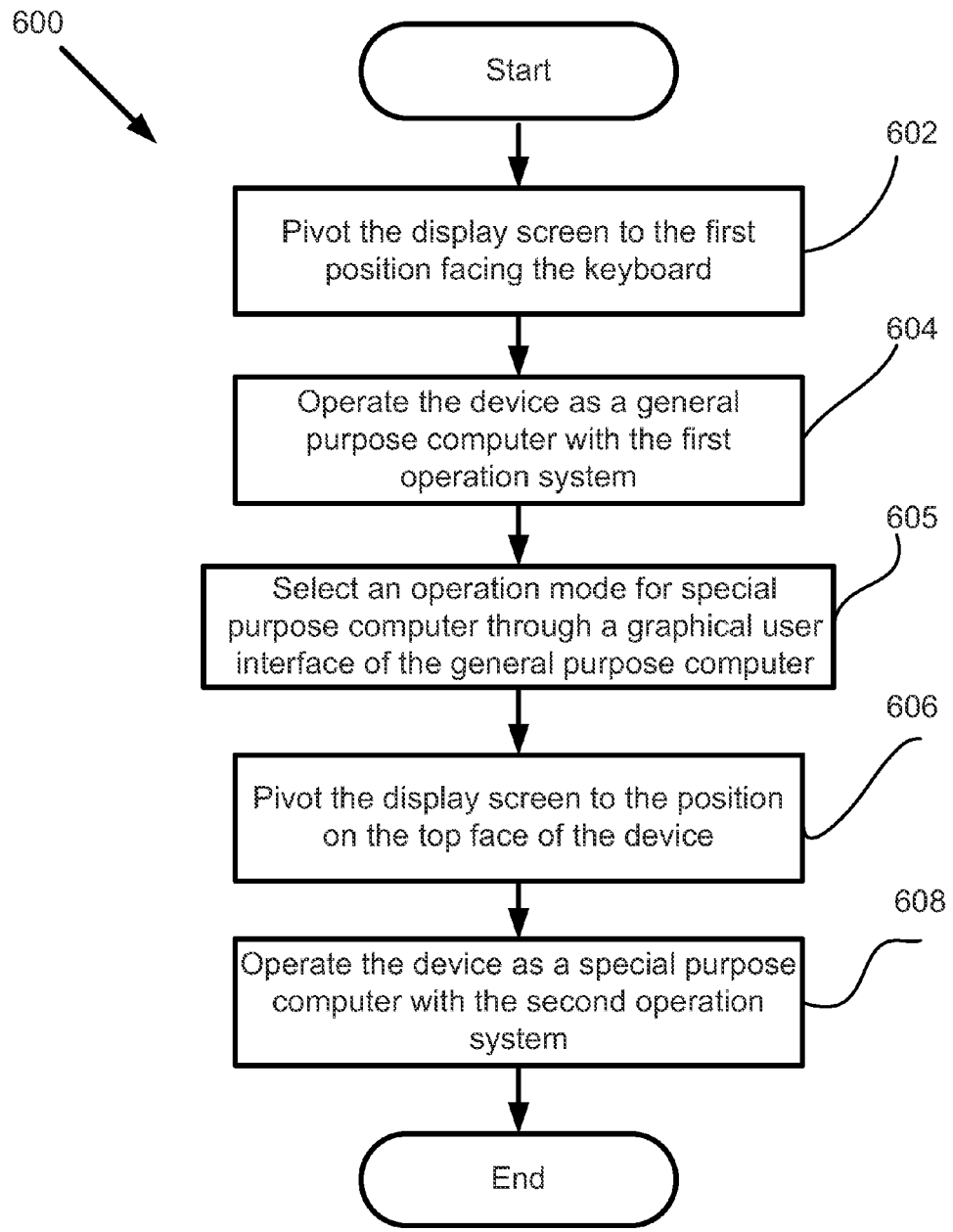
FIG. 6A is a flowchart illustrating operation of an exemplary portable computing device with a user selectable operation mode for the special purpose computer.

FIG. 6A is a flowchart illustrating operation of an exemplary portable computing device 100 with a user selectable operation mode for the special purpose computer. Process 600 starts with step 602 that display screen 108 is pivoted to a first position facing the keyboard. Portable computing device 100 is operated as a general purpose computer in step 604. The general purpose computer is operated with a first operating system. In an exemplary case, the first operation system is a Microsoft Windows® operating system. In step 605, the user selects an operation mode for the special purpose computer through graphical user interface 112. For example, the user may select to use portable device 100 as a dedicated media player. In step 606, display screen 108 is pivoted to the position on the top face of portable device 100. Portable device 100 is operated in step 608 as a special purpose computer. Portable device 100 operated as the special purpose computer may be operated with a second operating system. The second operating system is less complicated than the first operating system. Portable device 100 operated as the special purpose computer consumes less power than operated as the general purpose computer.

Figure 6B:
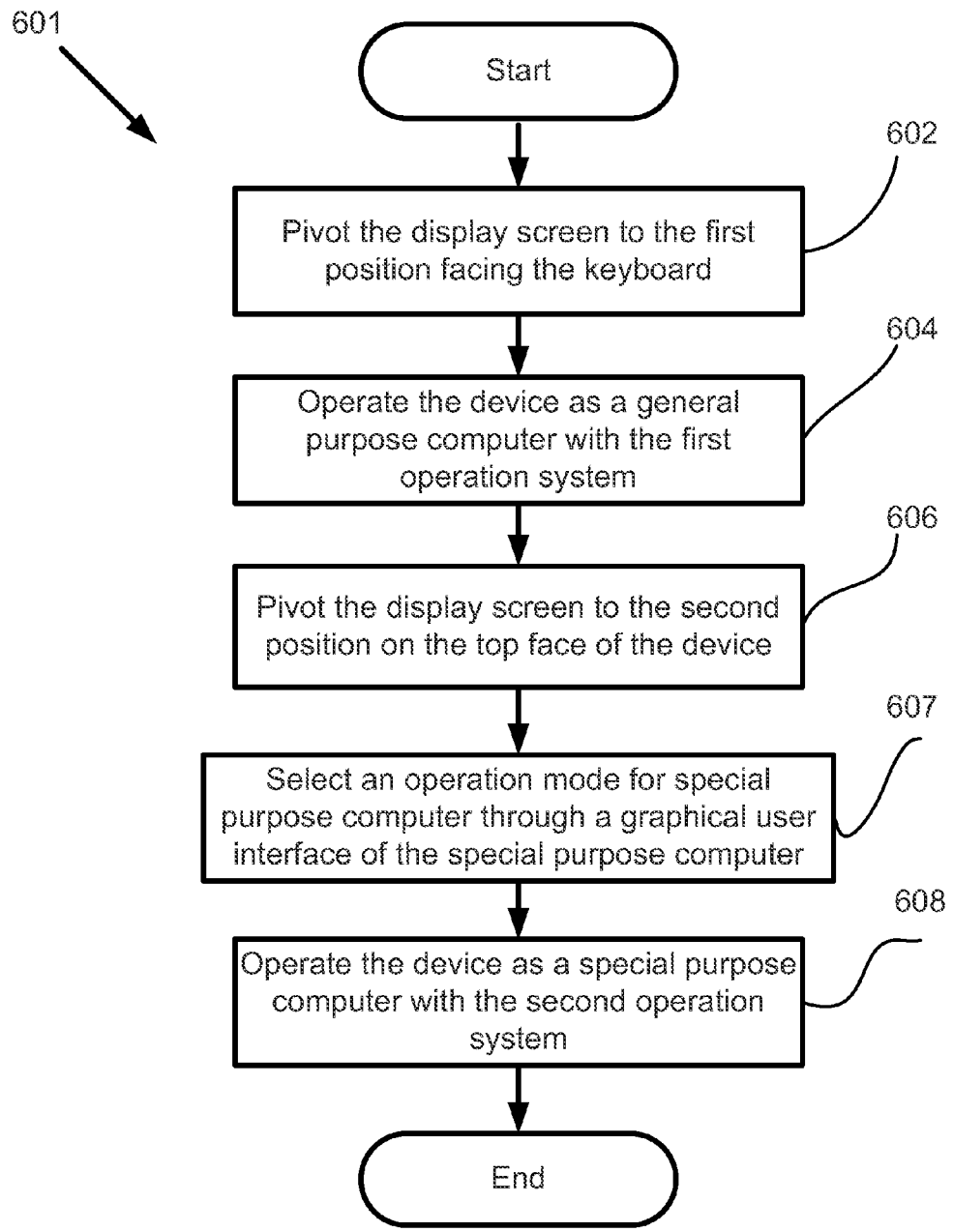
FIG. 6B is a flowchart illustrating operation of another exemplary portable computing device with a user selectable operation mode for the special purpose computer.

FIG. 6B is a flowchart illustrating operation of another exemplary portable computing device with a user selectable operation mode for the special purpose computer. Process 601 is similar to process 600 except that the operation mode for the special purpose computer is selected in step 607 rather than in step 605. In step 607, display screen 108 has been pivoted to the top face of portable device 100 and the user selects the operation mode through graphical user interface 114 for the special purpose computer. An advantage of the implementation is that the user may change the operation mode without pivoting displaying screen back to the position facing the keyboard.

Figure 7:
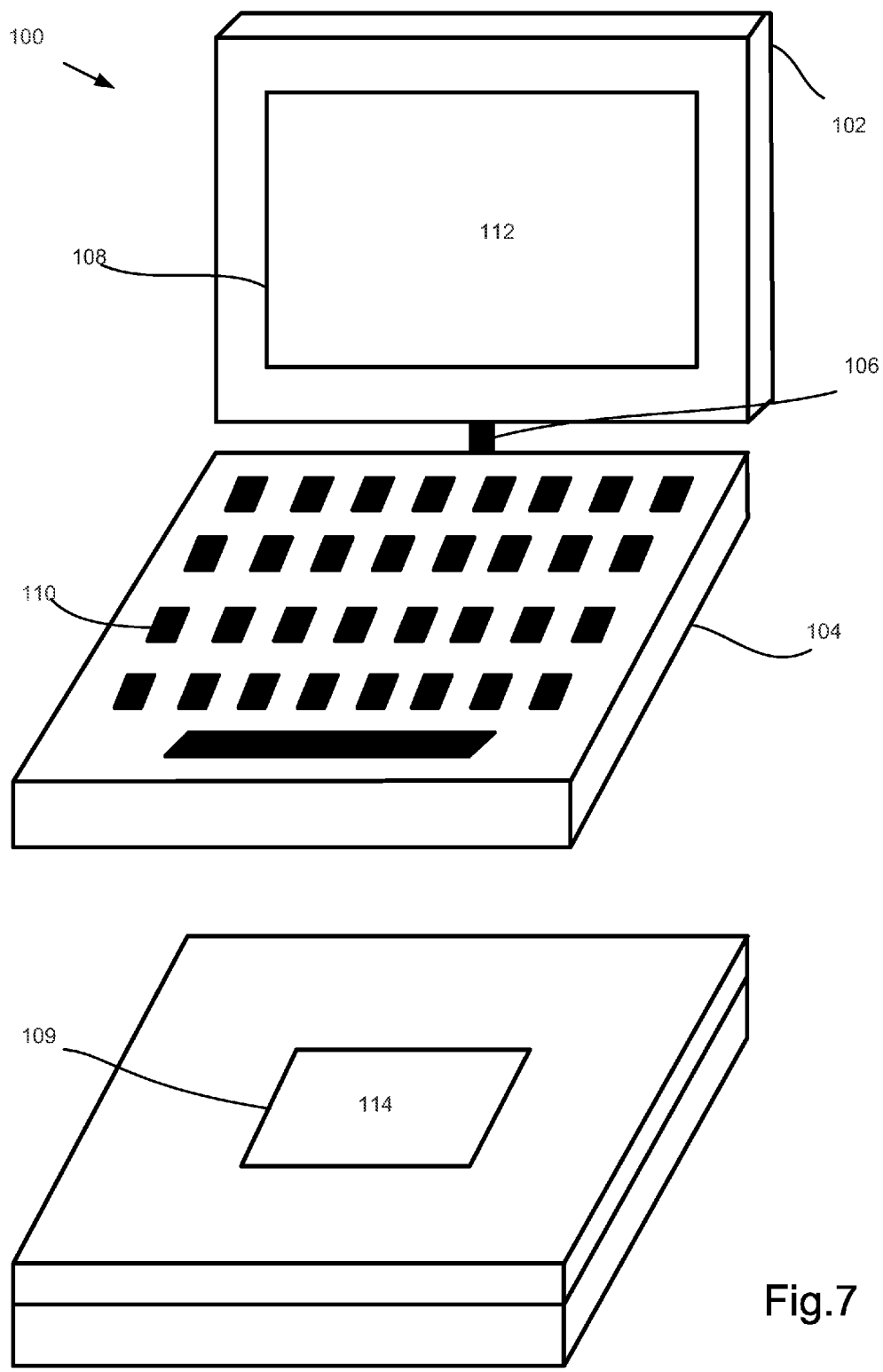
FIG. 7 is a schematic diagram illustrating an exemplary portable computing device with a twistable display screen, where only a portion of display screen is used when the device is used as a special purpose computer in a tablet form.

FIG. 7 is a schematic diagram illustrating an exemplary portable computing device 100 with the display screen in two operable positions, where only a portion of display screen is used when the device is used as a special purpose computer in a tablet form. The special purpose computer operated with a smaller display window 109 consumes less power. In an exemplary case that the special purpose computer is a dedicated media player, a smaller display window is sufficient when a hierarchical user interface is employed.

The invention claimed is:

1. A portable computing device in a flip form factor, the device comprising:
   a. a display part having two surfaces, wherein one of the surfaces comprises a touch sensitive type of display screen;
   b. a housing part comprising a Central Processing Unit, a storage unit, an input device and a communication unit;
   c. a hinge and pivot part for connecting the display part and the housing part and for pivoting the display part; and
   d. two operation modes including:
      i. a general purpose computer operated with a first operating system when the display screen is facing the housing part; and
      ii. a special purpose computer with a second operating system when the display screen is pivoted to be on a top face of the device, wherein said special purpose computer consumes less power than the general purpose computer.

2. The device as recited in claim 1, wherein said general purpose computer and said special purpose computer having independent functional blocks other than sharing a power supply and the display screen.

3. The device as recited in claim 1, wherein said general purpose computer and said special purpose computer having shared functional blocks other than sharing a power supply and the display screen, wherein said shared functional blocks further including the storage unit.

4. The device as recited in claim 1, wherein said input device further comprising a keyboard.

5. The device as recited in claim 1, wherein said special purpose computer comprising a low power processor.

6. The device as recited in claim 5, wherein said low power processor comprising a low power operating mode of said Central Processing Unit.

7. The device as recited in claim 1, wherein said special purpose computer comprising a dedicated media player.

8. The device as recited in claim 1, wherein said special purpose computer comprising a dedicated e-book reader.

9. The device as recited in claim 1, wherein said special purpose computer comprising a dedicated game console.

10. The device as recited in claim 1, wherein said special purpose computer comprising a dedicated digital camera.

11. The device as recited in claim 1, wherein said special purpose computer comprising a dedicated mobile phone.

12. The device as recited in claim 1, wherein said special purpose computer comprising a dedicated e-mail reader.

13. The device as recited in claim 1, wherein said special purpose computer comprising a dedicated web browser.

14. The device as recited in claim 1, wherein said device comprising a user selectable operation mode for the special purpose computer.

15. A portable computing device in a flip form factor, the device comprising:
   a. a display part having two surfaces, wherein one of the surfaces comprises a touch sensitive type of display screen;
   b. a housing part comprising a Central Processing Unit, a storage unit, an input device and a communication unit;
   c. a hinge and pivot part for connecting the display part and the housing part and for pivoting the display part; and
   d. two operation modes including:
      i. a general purpose computer when the display screen is facing the housing part; and
      ii. a special purpose computer when the display screen is pivoted to be on a top face of the device.

16. A method of employing a portable computing device as either a general purpose computer or a special purpose computer in an exclusive manner, wherein said device is in a flip form factor including a display part with a touch sensitive type of display screen on one of the two surfaces of the display part, a housing part and a hinge and pivot part for connecting the display part and the housing part, the method comprising:
   a. operating said device as the general purpose computer when the display screen is pivoted to a position facing the housing part;
   b. pivoting the display screen to a position on a top face of the device;
   c. switching the device as the special purpose computer; and
   d. displaying a graphical user interface on the display screen.

17. The method as recited in claim 16, wherein said method further comprising a step of selecting an operation mode for the special purpose computer by a user through a graphical user interface.

18. The method as recited in claim 17, wherein said step of selecting the operation mode is carried out through displaying user selectable items on the display screen when the device is operated as the general purpose computer.

19. The method as recited in claim 17, wherein said step of selecting the operation mode is carried out through displaying user selectable items on the display screen when the device is operated as the special purpose computer.

20. The method as recited in claim 16, wherein said special purpose computer consumes less power than the general purpose computer.

* * * * *